United States Patent
Niu et al.

(10) Patent No.: US 11,360,367 B2
(45) Date of Patent: Jun. 14, 2022

(54) POTENTIAL DROP COMPENSATED ELECTRO-OPTIC DEVICE

(71) Applicant: GENTEX CORPORATION, Zeeland, MI (US)

(72) Inventors: Xiaoxu Niu, Grand Rapids, MI (US); Adam R. Heintzelman, Grand Rapids, MI (US); Kurtis L. Geerlings, Zeeland, MI (US)

(73) Assignee: GENTEX CORPORATION, Zeeland, MI (US)

(*) Notice: Subject to any disclaimer, the term of this patent is extended or adjusted under 35 U.S.C. 154(b) by 84 days.

(21) Appl. No.: 17/012,095

(22) Filed: Sep. 4, 2020

(65) Prior Publication Data

US 2021/0072612 A1     Mar. 11, 2021

Related U.S. Application Data

(60) Provisional application No. 62/896,223, filed on Sep. 5, 2019.

(51) Int. Cl.
| | |
|---|---|
| G02F 1/153 | (2006.01) |
| G02F 1/03 | (2006.01) |
| G09G 3/19 | (2006.01) |
| G09G 3/38 | (2006.01) |
| G02F 1/163 | (2006.01) |

(Continued)

(52) U.S. Cl.
CPC ............ G02F 1/163 (2013.01); B60J 3/04 (2013.01); B60R 1/02 (2013.01)

(58) Field of Classification Search
CPC ...... G02F 1/155; G02F 1/1523; G02F 1/1525; G02F 1/1521; G02F 1/1533; G02F 1/03; G02F 1/0316; G02F 1/163; G02F 3/16; C09K 9/02; B60R 1/088; H04N 9/3137; H04N 9/22
USPC ............. 359/265–275, 277, 245–247, 242; 345/49, 105, 107; 248/817; 438/929
See application file for complete search history.

(56) References Cited

U.S. PATENT DOCUMENTS

| | | |
|---|---|---|
| 753,561 A | 3/1904 | Edmunds |
| 5,973,818 A | 10/1999 | Sjursen et al. |

(Continued)

OTHER PUBLICATIONS

International Search Report dated Dec. 3, 2020, for correspondence PCT application No. PCT/US2020/049301, 2 pages.

(Continued)

*Primary Examiner* — Dawayne Pinkney
(74) *Attorney, Agent, or Firm* — Price Heneveld LLP; Brian James Brewer

(57) ABSTRACT

An electro-optic system where an electrical potential is changed and/or regulated to achieve a desired potential applied to an electro-optic medium. The electro-optic system comprises an electro-optic medium disposed in a chamber defined in part by two electrodes. A power source is connected to the two electrodes and thereby operable to apply an electrical potential to the electrochromic medium across the two electrodes. A voltmeter is operable to measure an electrical potential between two points within the chamber. Additionally, a controller is connected to the voltmeter and the power source and is operable to regulate the electrical potential applied by the power source based, at least in part, on the electrical potential measured between the two points within the chamber by the voltmeter.

19 Claims, 3 Drawing Sheets

(51) Int. Cl.
 *B60J 3/04* (2006.01)
 *B60R 1/02* (2006.01)

(56) References Cited

U.S. PATENT DOCUMENTS 6,336,753 B1 * 1/2002 Kihira ................... G02F 1/1506
 396/506
9,188,828 B1 11/2015 Chung et al.

OTHER PUBLICATIONS

Written Opinion dated Dec. 3, 2020, for correspondence PCT application No. PCT/US2020/049301, 5 pages.
Jim Williams, Jesus Rosales, Kurk Mathews, Tom Hack, 2-Wire Virtual Remote Sensing for Voltage Regulators-Clairvoyance Marries Remote Sensing, Linear Technology,Oct. 2010, 22 pages, Application Note 126, Linear Technology Corporation, Milpitas, CA.

* cited by examiner

POTENTIAL DROP COMPENSATED ELECTRO-OPTIC DEVICE

CROSS-REFERENCE TO RELATED APPLICATIONS

This application claims priority under 35 U.S.C. § 119(e) to U.S. Provisional Application No. 62/896,223 filed on Sep. 5, 2019, entitled "POTENTIAL DROP COMPENSATED ELECTROCHROMIC DEVICE," the disclosure of which is hereby incorporated by reference in its entirety.

FIELD OF INVENTION

The present invention relates in general to electro-optic devices and, more particularly, to applying an electrical potential to an electro-optic medium in an electro-optic device.

BACKGROUND OF INVENTION

Electro-optic devices are well known. When a sufficient electrical potential is applied across a pair of electrodes, an electro-optic medium, disposed between the electrodes, becomes activated. Some electro-optic devices are electrochromic and accordingly, when activated, change their color and/or light transmissivity. Taking advantage of this, devices such as dimmable mirrors and windows have become increasingly popular in industries such as automotive and aviation.

However, the electrical potential supplied by the power source (i.e. the drive potential) does not equal the potential actually delivered to the electro-optic medium (i.e. the EO potential). Inrush currents and variances in resistance from one electro-optic device to another during manufacturing are largely responsible for this potential drop. Accordingly, not only may the potential drop vary from device to device, but it may dynamically vary during operation. Therefore, there is a need for an improved system for delivering an electrical potential to an electro-optic medium that compensates for this drop in electrical potential such that an intended electrical potential may more nearly be actually applied to the electro-optic medium.

SUMMARY

In accordance with the present disclosure, the disadvantages and problems associated with operating an electro-optic device in the past are substantially reduced or eliminated.

In accordance with one aspect of the present disclosure, a device comprising a first substrate, a second substrate, a seal, a first electrode, a second electrode, an electro-optic medium, a power source, a voltmeter, and a controller is disclosed. The first substrate may have a first surface and a second surface. The second substrate may have a third surface and a fourth surface. Additionally, the first and second substrates may be disposed placed in a spaced-apart relationship. The first electrode may be disposed on the second surface. The second electrode may be disposed on the third surface. The seal may define a chamber in conjunction with the first electrode and the second electrode. The electro-optic medium may be disposed in the chamber. In embodiments, the electro-optic medium may be electrochromic. The power source may be electrically connected to the first and second electrodes. Further, the power source may be operable to supply a first electrical potential. The voltmeter may be operable to measure a second electrical potential between two points within the chamber. The controller may be communicatively connected to the voltmeter and the power source. Additionally, the controller may be operable to change the first electrical potential supplied by the power source based, at least in part, on the measured second electrical potential. The first electrical potential may be changed to achieve a desired value of the second electrical potential. The desired value of the second electrical potential may correspond to a desired degree of activation of the electro-optic medium. Further, the change of the first electrical potential may be part of a regulation of the first electrical potential by the controller. The first substrate, the second substrate, the first electrode, the second electrode, the seal, and the electro-optic chamber may be a part of and disposed in a rearview assembly or a window.

In accordance with another aspect of the present disclosure, a system comprising a power source, an electro-optic device, a voltmeter, and a controller is disclosed. The power source may be operable to supply a first electrical potential. The electro-optic device may comprise a chamber with an electro-optic medium disposed therein. Additionally, the electro-optic device may be electrically connected to the power source and may be configured to apply a second electrical potential to the electro-optic medium. The electro-optic medium may be electrochromic. In some embodiments, the electro-optic device may be a rearview assembly or a dimmable window. The voltmeter may be operable to measure a third electrical potential across two points within the chamber. The controller may be configured to change the first electrical potential based, at least in part, on the measured third electrical potential. The first electrical potential may be changed to achieve a desired value of the third electrical potential. The desired value of the third electrical potential may correspond to a desired degree of activation of the electro-optic medium. Further, the change of the first electrical potential may be part of an ongoing regulation of the first electrical potential by the controller.

In accordance with yet another aspect of the present disclosure, a method of operating an electro-optic device is disclosed. The method may comprise supplying a first electrical potential to an electro-optic device, measuring with a voltmeter a second electrical potential across two points within a chamber of the electro-optic device, and changing the first electrical potential based, at least in part, on the measured second electrical potential. The first electrical potential may be changed to achieve a desired value of the second electrical potential. The desired value of the second electrical potential may correspond to a degree of activation of the electro-optic medium. In some embodiments, the method may further comprise re-measuring the second electrical potential after the first electrical potential is changed and changing the first electrical potential again based, at least in part, on the re-measured second electrical potential. The electro-optic device may be electrochromic and/or take the form of a rearview assembly or a window.

The technical advantages of certain embodiments of the present disclosure include compensating for inherent electrical potential drops between the electrical potential supplied by a power source and the actual electrical potential experienced by the electro-optic medium. Accordingly, the desired electro-optic potential is more accurately achieved and/or maintained than in previous electro-optic devices, producing more reliable and constant electro-optic activation.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, the specific devices and processes illustrated in the attached drawings and described in this disclosure are simply exemplary embodiments of the inventive concepts defined in the appended claims. Hence, specific dimensions and other physical characteristics relating the embodiments disclosed herein are not limiting, unless the claims expressly state otherwise.

Figure 1:
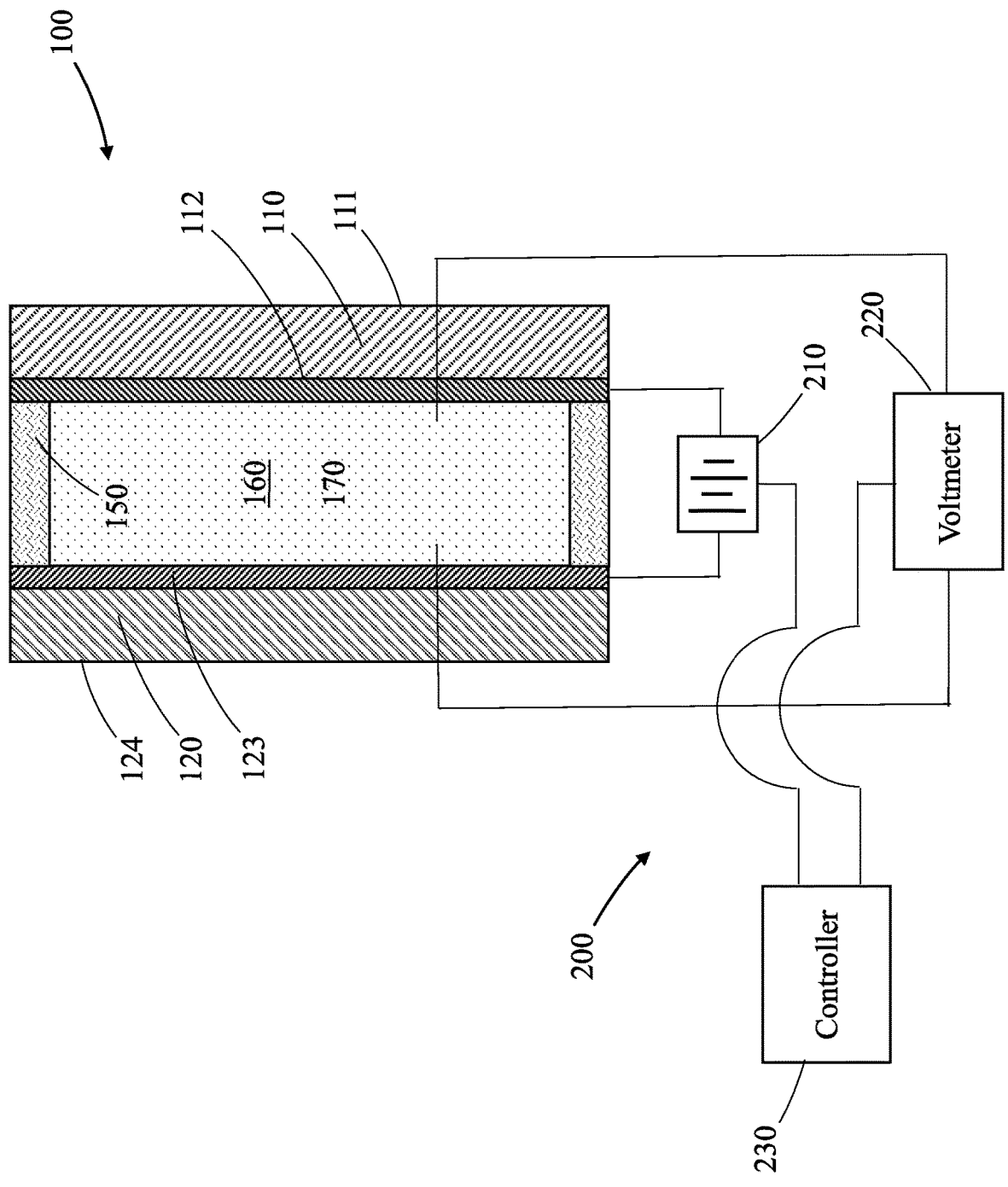
FIG. 1: Cross sectional schematic representation of an electro-optic device and an accompanying potential drop compensation system.
Figure 2:
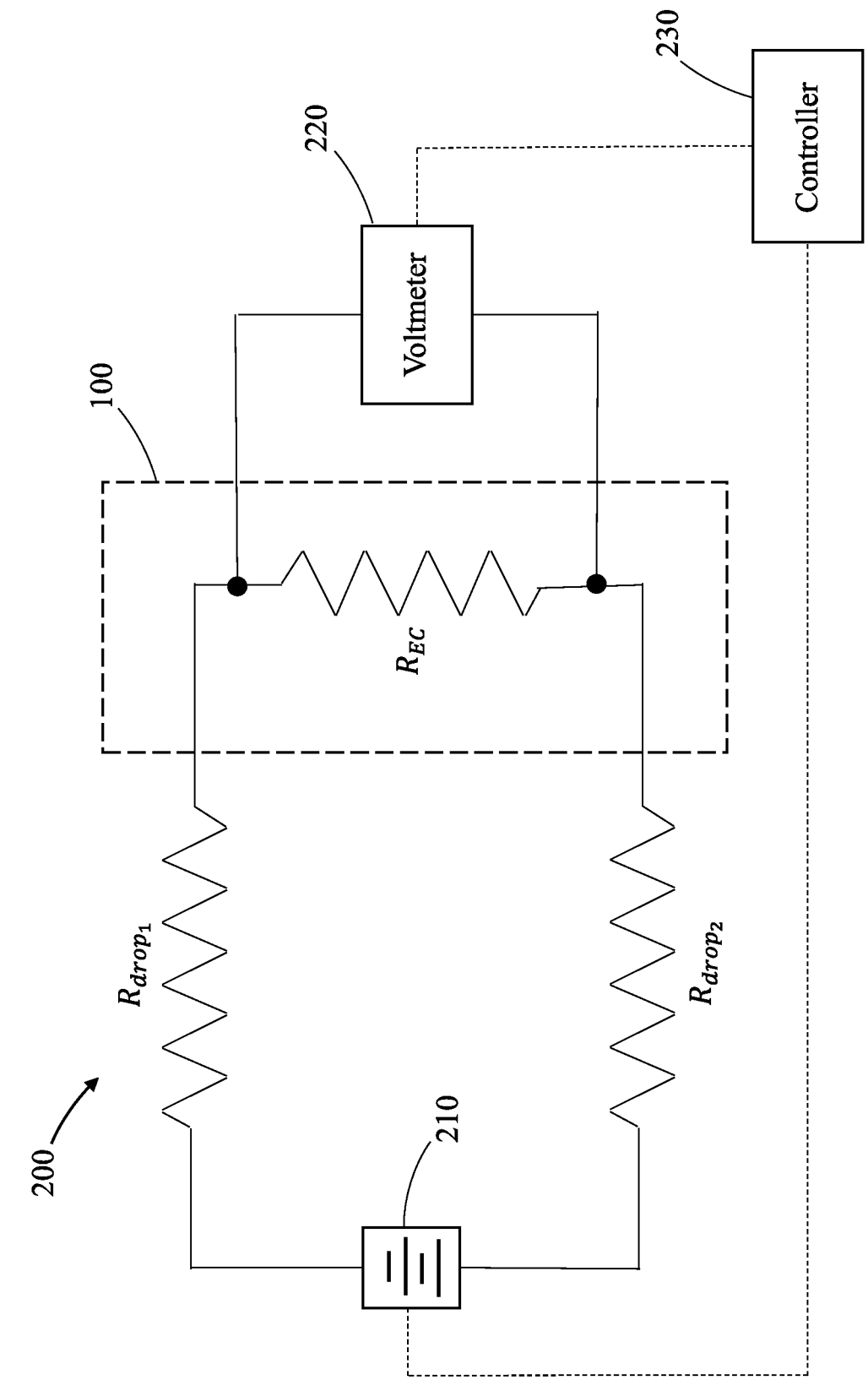
FIG. 2: Electrical circuit schematic of an electro-optic device and an accompanying potential drop compensation system.

FIG. 1 is a cross sectional schematic representation of an electro-optic device 100 and an accompanying potential drop compensation system 200. Additionally, FIG. 2 is a corresponding electrical circuit schematic of electro-optic device 100 and the accompanying potential drop compensation system 200. Further, as merely schematic representations, some of the components have been distorted from their actual scale for pictorial clarity.

Electro-optic device 100, as shown in FIG. 1 and represented by the dashed box in FIG. 2, for example, may be a mirror, a rearview assembly, a window, a display device, a contrast enhancement filter, and the like. Electro-optic device 100 may comprise: a first substrate 110, a second substrate 120, a first electrode 130, a second electrode 140, a seal 150, a chamber 160 and an electro-optic medium 170.

First substrate 110 comprises a first surface 111 and a second surface 112. Further, first substrate 110 may be fabricated from any of a number of materials that are transparent or substantially transparent in the visible region of the electromagnetic spectrum, such as borosilicate glass, soda lime glass, float glass, natural and synthetic polymeric resins, plastics, and/or composites. Numerous substrate materials may likewise be used—so long as the materials are at least substantially transparent and exhibit appropriate physical properties such as strength and tolerance to conditions of the device's environment, such as ultra-violet light exposure from the sun and temperature extremes.

Second substrate 120 comprises a third surface 123 and a fourth surface 124. Further, second substrate 120 may be fabricated from the same or similar materials as that of first substrate 110. However, if electro-optic device 100 is a mirror, then the requisite of substantial transparency is not necessary. Accordingly, in such case, second substrate 120 may alternatively comprise polymers, metals, glass, and ceramics.

First electrode 130 is an electrically conductive material associated with second surface 112. The electrically conductive material of first electrode 130 is substantially transparent in the visible region; bonds reasonably well to first substrate 110; and is generally resistant to corrosion from materials contained within electro-optic device 100. The that electrically conductive material may be a transparent conductive oxide (TCO), such as fluorine doped tin oxide (FTO), indium-doped oxide (ITP), doped zinc oxide, or other materials known in the art.

Second electrode 140, is an electrically conductive material associated with third surface 123. In some embodiments, second electrode 140 may be substantially transparent. In such an embodiment, the electrically conductive material of second electrode 140 may be fabricated from the same or similar materials as that of first electrode 130. Such a construction may be adopted when electro-optic device 100 is a window. In other embodiments, the requisite of substantial transparency is not necessary. One example of where the requisite of substantial transparency is not necessary is when electro-optic device 100 is a mirror. Accordingly, in such an embodiment, second electrode 140 may be fabricated from a reflective conductive material or comprise a reflective layer. Alternatively, a reflector may be associated with second electrode 140, with third surface 123 between second electrode 140 and second substrate 120, or with fourth surface 124 of second substrate 120. Typical reflective materials include chromium, rhodium, ruthenium, silver, and combinations thereof.

Sealing member 150, is disposed in a peripheral manner to define a chamber 160 in conjunction with at least two of: first substrate 110, second substrate 120, first electrode 130, and second electrode 140. In some embodiments, chamber 160 may more specifically be defined by seal 150, first electrode 130, and second electrode 140. Sealing member 150 may comprise any material capable of being adhesively bonded to at least two of: first substrate 110, second substrate 120, first electrode 130, and second electrode 140, to in turn seal chamber 160, such that electro-optic medium 170 does not inadvertently leak out. In some embodiments, sealing member 150 may be disposed between first substrate 110 and second substrate 120. In other embodiments, sealing member 150 may be disposed about and extending between the peripheries of the first and second substrates 110, 120.

Electro-optic medium 170 is disposed in chamber 160. Electro-optic medium 170 is electro-active. Accordingly, electro-optic medium 170 may include, among other materials, electro-active anodic and cathodic materials. In some embodiments, the anodic and/or cathodic materials may be electrochromic. Therefore, upon activation, the anodic and/or cathodic materials, due to the application of an electronic voltage or potential, may exhibit a change in absorbance at one or more wavelengths of the electromagnetic spectrum. The change in absorbance may be in the visible, infra-red, and/or near infra-red regions. Electro-optic medium 170 may be fabricated from any one of a number of materials, including, for example, those disclosed in U.S. Pat. No. 6,433,914, entitled "Color-Stabilized Electrochromic Devices," which is herein incorporated by reference in its entirety.

Potential drop compensation system 200 comprises: a power source 210, a voltmeter 220, and a controller 230. Power source 210 may be any device operable to provide an electrical potential. For example, power source 210 may be a battery or a generator. Further, power source 210 is electrically coupled to the first and second electrodes 130, 140 of electro-optic device 100. Voltmeter 220 comprises two or more high impedance electrical leads disposed within chamber 160 of electro-optic device 100. Controller 230 is communicatively coupled to power source 210 and voltmeter 220. Further, potential drop compensation system 200 may be a single integrated chip or a combined system.

In operation, electro-optic device 100 may be operable between an activated and an un-activated state. The state of electro-optic device 100 corresponds to the state of electro-optic medium 170, which is electro-active. As such, the state of electro-optic device 100 may be controlled by the first and second electrodes 130, 140. The first and second electrodes 130, 140 may operate to deliver an electrical potential across electro-optic medium 170. Further, electro-optic medium 170 may be increasingly activated with an increasing electrical potential. Additionally, since electro-optic medium 170 may be electrochromic, electro-optic device 100 may be variably transmissive. In other words, electro-optic device 100 may be operable to dim.

Potential drop compensation system 200 may compensate for inherent electrical potential drops of electro-optic device 100. Power source 210 supplies an electrical potential often referred to as a drive potential. However, the electrical potential ultimately and actually applied to electro-optic medium 170 and responsible for the electro-optic medium's 170 activation, may be less than the drive potential. This potential may be referred to as the electro-optic potential. Accordingly, voltmeter 220 measures the electro-optic potential with the leads disposed within chamber 160. This measurement is relayed to controller 230, which in turn may change the drive potential from a first value to a second value in order to achieve a pre-determined and/or desired electro-optic potential. In some embodiments, the change of the drive potential may be part of an ongoing dynamic regulation of the drive potential by controller 230. The desired value of the electro-optic potential may correspond to a degree of activation of the electro-optic medium. The degree of activation may correspond to an activation state between fully activated and de-activated.

The present disclosure has the technical advantage of compensating for inherent electrical potential drops between the electrical potential supplied, by power source 210 and the actual electrical potential that is ultimately experienced and/or absorbed by electro-optic medium 170. Electrical potential is governed by the following equation: $V=I \cdot R$, where V is electrical potential, I is current, and R is resistance. The electrical potential in an electro-optic device 100 is further governed by the equation: $V_{Drive}=V_{EO}+V_{Drop}$, where $V_{Drop}$ is the electrical potential lost outside of electrochromic medium and $V_{EO}$ is the electrical potential absorbed by the electro-optic medium. Accordingly, these equations may be combined to achieve the following: $V_{Drive}=I_{EO} \cdot R_{EO}+I_{drop} \cdot R_{drop}$. Further, the electrical circuit of electro-optic device 100 is in series, therefore, $I_{EO}$ and $I_{drop}$ are the same, allowing for reduction of the equation to: $V_{Drive}=I(R_{EO}+R_{drop})$.

$R_{EO}$ and $R_{drop}$ change based on a large number of factors. These factors are largely fixed for an operation of electro-optic device 100 and may include: inconsistencies caused during manufacturing, impurities, geometry, distance, ambient temperature, and materials used. However, $R_{EO}$ has increased complexity in that while the factors for any given operation are generally fixed, it is also influenced by the electro-optic medium's 170 temperature—which increases during operation, causing $R_{EO}$ to decrease. Further, the increase in temperature and consequential reduction of $R_{EO}$ impact I to maintain the equation's balance. Additionally, electro-optic device 100 experiences an inrush current, which results in a changing I.

Thus, due to the circumstances surrounding an operation of an electro-optic device 100, the variables impacting the electrical potential applied to electro-optic medium 170 are frequently fluctuating, resulting in a changing $V_{EO}$, which may cause change to the electro-optic device's 100 transmissivity. However, the implementation of the potential drop compensation system 200, may have the advantages of measuring $V_{EO}$ directly and changing and/or dynamically regulating $V_{Drive}$ to stabilize $V_{EO}$ despite the changing variables.

Figure 3:
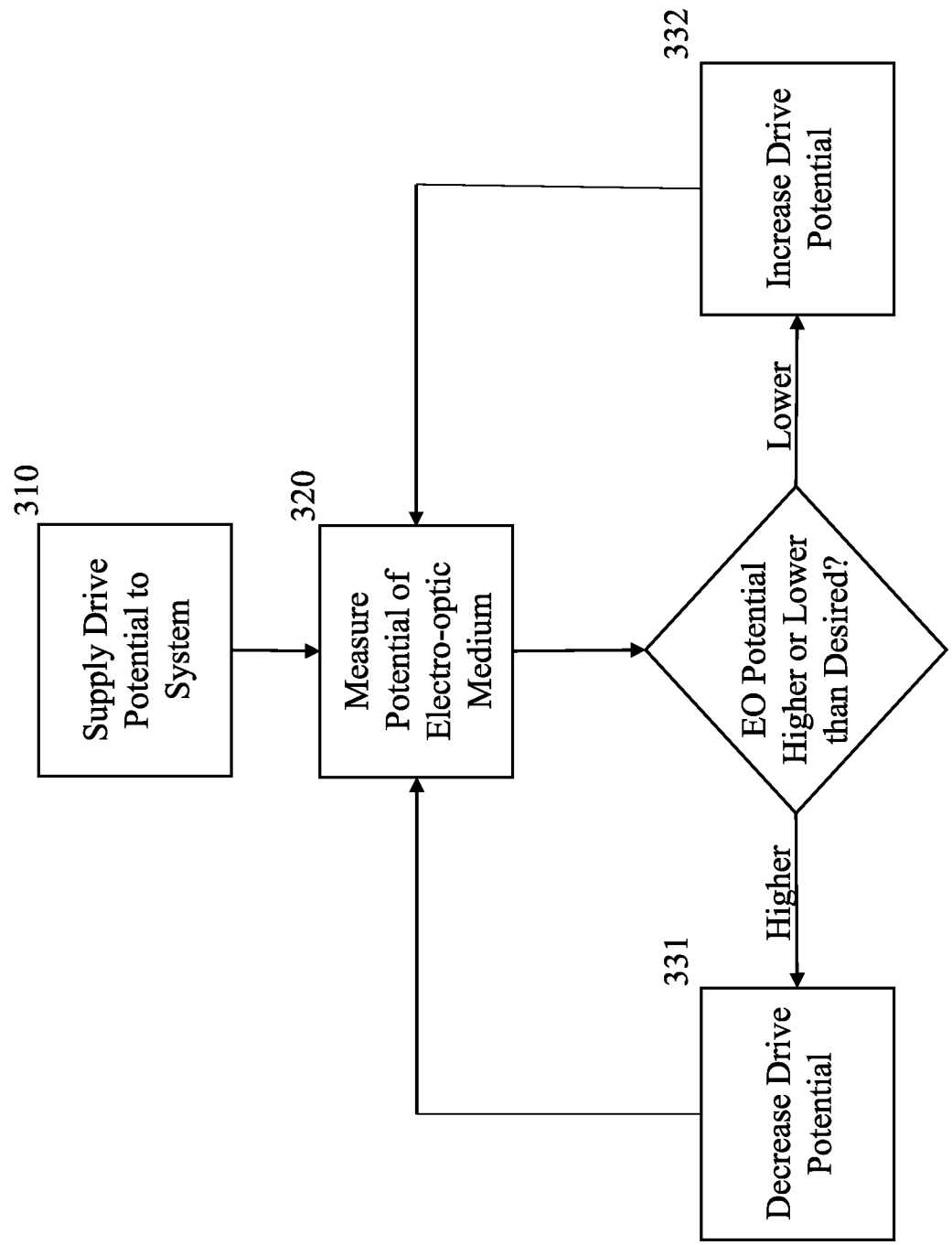
FIG. 3: Process flow chart for regulating an electrical drive potential based, at least in part, on a measured potential actually applied to an electro-optic medium.

FIG. 3 is a process flow chart for changing and/or regulating an electrical potential output from a power source based, at least in part, on a measured electro-optic potential. The process comprises the steps of supplying a drive potential 310, measuring a potential of an electro-optic medium 320, and decreasing 331 or increasing 332 the drive potential. In some embodiments, the process may return to measuring the EC potential 320 and cyclically repeat itself any number of times. In such an embodiment, changing of the drive potential may be part of a dynamic regulation of the drive potential based, at least in part, on the measured potential of the electro-optic medium.

Step 310 depicts the first step of applying a drive potential. In this step, a power source supplies an electrical potential to a system comprising an electro-optic chamber. Disposed in the electro-optic chamber is an electro-optic medium. The power source may be any device operable to supply the electrical potential, for example, power source may be a battery or a generator.

In step 320 the potential of the electro-optic medium is measured. The potential is measured by a voltmeter with two or more high impedance leads disposed within the chamber containing the electro-optic medium.

In steps 331 and 332 the drive potential is decreased 331 or increased 332, respectively. To determine if the potential is to be decreased 331 or increased 332, the potential of the electrochromic medium measured at step 320 may be transmitted to a controller. The controller may compare the measured potential with a desired potential. The desired electro-optic potential may be determined by the level of electro-optic activation desired, since the electro-optic medium may be activated proportional to the electrical potential it absorbs. The level of activation may further correspond to its transmissiveness. If the measured potential is higher or lower than the desired electrochromic potential, the drive potential is lowered or raised accordingly.

In some embodiments, after the drive potential is changed in either step 331 or 332, the process may revert back to step 320 where the potential of the electro-optic medium is re-measured. Thus, a cycle is enabled wherein the drive potential is continuously and dynamically regulated to substantially achieve and/or maintain a desired electro-optic medium potential, despite changing conditions. Further, cyclically repeating the process enables the drive potential to be further regulated in the event it was under or over adjusted in the previous cycle.

For example, a drive potential of 1.2 V may be supplied with a desire of potential of 1.2 V being applied to the electro-optic medium. Subsequently, the potential of the electro-optic medium is measured at 1.0 V. Accordingly, the drive potential may be increased by 0.2 V (the difference between the 1.2 V desired electro-optic potential and the 1.0 V measured potential of the electro-optic medium) to 1.4 V. Optionally, the potential of the electro-optic medium may be re-measured and as having a potential of 1.3 V and the drive potential accordingly decreased by 0.1 V (the difference between the 1.2 desired electro-optic potential and the 1.3 V measured potential of the electro-optic medium) to 1.3 V.

Some embodiments of the present disclosure may have the advantage of compensating for inherent electrical potential drops between the electrical potential supplied, by a power source, and the actual electrical potential experienced by the electro-optic medium. Accordingly, the electro-optic potential desired may be more accurately achieved and maintained than in previous electro-optic devices, producing more reliable and constant electro-optic transmissivity states for electrochromic electro-optic devices.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the elements.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A device comprising:
   a first substrate having a first surface and a second surface;
   a second substrate having a third surface and a fourth surface, the second substrate disposed in a spaced-apart relationship with the first substrate;
   a first electrode disposed on the second surface;
   a second electrode disposed on the third surface;
   a seal defining a chamber in conjunction with the first electrode and the second electrode;
   an electrochromic medium disposed in the chamber and operable to exhibit a change in absorbance at one or more wavelengths of the electromagnetic spectrum;
   a power source electrically connected to the first and second electrodes, the power source operable to supply a first electrical potential;
   a voltmeter having two high impedance electrical leads disposed within the chamber and operable to measure a second electrical potential between two points within the chamber; and
   a controller communicatively connected to the voltmeter and the power source, the controller operable to change the first electrical potential supplied by the power source based, at least in part, on the measured second electrical potential to compensate for a drop between the supplied first electrical potential and the second electrical potential actually applied to the electrochromic medium, the drop caused, at least in part, by at least one of: impurities, temperature, and inrush current.

2. The device of claim 1, wherein the first electrical potential is changed to achieve a desired value of the second electrical potential.

3. The device of claim 2, wherein the desired value of the second electrical potential corresponds to a desired degree of activation of the electrochromic medium.

4. The device of claim 1, wherein the change of the first electrical potential is part of a regulation of the first electrical potential by the controller.

5. The device of claim 1, wherein the first substrate, the second substrate, the first electrode, the second electrode, the seal, and the electro-optic chamber are disposed in a rearview assembly.

6. The device of claim 1, wherein the first substrate, the second substrate, the first electrode, the second electrode, the seal, and the electro-optic chamber are disposed in a window.

7. A system comprising:
   a power source operable to supply a first electrical potential;
   an electro-optic device comprising a chamber with an electro-optic medium disposed therein, the electro-optic device electrically connected to the power source and configured to apply a second electrical potential to the electro-optic medium;
   a voltmeter having two high impedance electrical leads disposed within the chamber and operable to measure a third electrical potential across two points within the chamber; and
   a controller configured to change the first electrical potential based, at least in part, on the measured third electrical potential to compensate for a drop between the first and second electrical potentials, the drop caused, at least in part, by at least one of: impurities, temperature, and inrush current.

8. The system of claim 7, wherein the first electrical potential is changed to achieve a desired value of the third electrical potential.

9. The system of claim 8, wherein the desired value of the third electrical potential corresponds to a desired degree of activation of the electro-optic medium.

10. The system of claim 7, wherein the change of the first electrical potential is part of an ongoing regulation of the first electrical potential by the controller.

11. The system of claim 7, wherein the electro-optic medium is electrochromic.

12. The system of claim 7, wherein the electro-optic device is a rearview assembly.

13. The system of claim 7, wherein the electro-optic device is a dimmable window.

14. A method of operating an electro-optic device comprising:
   supplying a first electrical potential to an electro-optic device;
   measuring with a voltmeter having two high impedance leads disposed within a chamber of the electro-optic device a second electrical potential across two points within the chamber; and
   changing the first electrical potential based, at least in part, on the measured second electrical potential to compensate for a drop between the supplied first electrical potential and the second electrical potential in the chamber, wherein the drop is caused, at least in part, by at least one of: impurities, temperature, and inrush current.

15. The method of claim 14, further comprising:
re-measuring the second electrical potential after the first electrical potential is changed; and
changing the first electrical potential again based, at least in part, on the re-measured second electrical potential.

16. The method of claim 14, wherein the first electrical potential is changed to achieve a desired value of the second electrical potential.

17. The method of claim 16, wherein the desired value of the second electrical potential corresponds to a degree of activation of the electro-optic medium.

18. The method of claim 14, wherein the electro-optic device is electrochromic.

19. The method of claim 14, wherein the electro-optic device is rearview assembly.

* * * * *